US005793284A

United States Patent [19]

Teague

[11] Patent Number: 5,793,284

[45] Date of Patent: Aug. 11, 1998

[54] PORTABLE RADIO PAGING ALARM APPARATUS AND ASSOCIATED METHOD FOR A VEHICLE CONTAINING AN ANIMAL

[76] Inventor: Jeffrey K. Teague, 3816 Heatherington Rd., Orlando, Fla. 32808

[21] Appl. No.: 444,379

[22] Filed: May 18, 1995

[51] Int. Cl.[6] ..................... B60Q 1/00

[52] U.S. Cl. ..................... 340/438; 340/57.3; 340/501

[58] Field of Search ..................... 340/438, 439, 340/585-86, 588-89, 311.1, 506, 825.44, 825.45, 870.11, 501, 573, 546

[56] References Cited

U.S. PATENT DOCUMENTS

| | | | |
|---|---|---|---|
| 3,634,840 | 1/1972 | Wilkinson | 340/228 R |
| 3,753,259 | 8/1973 | Donovan | 340/585 |
| 3,848,231 | 11/1974 | Wootton | 340/585 |
| 4,024,495 | 5/1977 | O'Brien | 340/57 |
| 4,028,688 | 6/1977 | Goleman | 340/585 |
| 4,228,426 | 10/1980 | Roberts | 340/311.1 |
| 4,385,289 | 5/1983 | McMillan | 340/585 |
| 4,606,073 | 8/1986 | Moore | 455/89 |
| 4,741,020 | 4/1988 | Deal et al. | 340/311.1 |
| 4,851,822 | 7/1989 | Barnett | 340/635 |
| 4,970,496 | 11/1990 | Kirkpatrick | 340/585 |
| 4,990,890 | 2/1991 | Newby | 340/539 |
| 4,996,517 | 2/1991 | Kringen et al. | 340/506 |
| 5,049,867 | 9/1991 | Stouffer | 340/426 |
| 5,481,245 | 1/1996 | Moldavsky | 340/586 |
| 5,708,417 | 1/1998 | Tallman et al. | 340/539 |

OTHER PUBLICATIONS

*Temp° Alert*, Installation/Owner Manual (Model No. TA-2HL), Winland Electronics, Inc.

*Press Journal*, Aug. 6, 1990, Vero Beach, FL, Adam Chirzan, Press Journal Staff Writer.

Hotdog™, A Temperature Monitoring and Alerting System For The Interior of Canine Vehicles, Criminalistics, Inc.

*Primary Examiner*—Jeffery A. Hofsass
*Assistant Examiner*—Ashok Mannava
*Attorney, Agent, or Firm*—Allen, Dyer, Doppelt, Milbrath & Gilchrist, P.A.

[57] ABSTRACT

An alarm apparatus includes a vehicle temperature sensor, a vehicle power failure sensor, and a radio paging alarm generator for generating a radio paging output signal to a remote paging receiver carried by an animal caregiver responsive to one of vehicle temperature being outside a predetermined temperature range, and failure of vehicle AC or DC electrical power. Accordingly, the animal caregiver is alerted by the radio paging alarm signal when the temperature within the vehicle is outside the predetermined range or when the temperature within the vehicle is likely to move outside the predetermined range as indicated by a failure of electrical power of the vehicle. Method aspects of the invention are also disclosed.

23 Claims, 3 Drawing Sheets

PORTABLE RADIO PAGING ALARM APPARATUS AND ASSOCIATED METHOD FOR A VEHICLE CONTAINING AN ANIMAL

FIELD OF THE INVENTION

The invention relates to the field of sensors and alarms, and, more particularly, to an alarm apparatus and associated method for sensing conditions within a vehicle.

BACKGROUND OF THE INVENTION

A motor vehicle is commonly used to transport an animal, such as a pet, show animal, or K-9 patrol dog. In addition, such an animal may be left unattended in a vehicle for a length of time and in relatively warm weather conditions. These conditions typically require constant ventilation of the interior or animal carrying portion of the vehicle. More particularly, warm ambient conditions require air conditioning of the vehicle interior when the animal is left unattended for even short periods of time. If the ventilation were to stop or the air conditioning were to fail, the animal's health may be jeopardized as temperatures may quickly rise within a closed vehicle.

Various sensing and alarm devices have been developed to alert an animal owner or caregiver who is temporarily away from the vehicle containing the animal. One such temperature alarm device is offered by Radiotronics Inc. of Jupiter, Fla. under the model designation K-9 Lifeguard. The alarm device includes a housing, a temperature sensor mounted on the housing, and a radio pager to send a radio paging signal to a remote paging receiver carried by the caregiver to alert the animal caregiver to an excessive temperature within the vehicle. The alarm device is particularly directed for mounting in a police car or other passenger-type vehicle where running of the vehicle engine is needed to run the air conditioner. In addition, the device also includes a sensor for determining if the vehicle engine stalls, since the engine directly drives the air conditioning compressor in such a vehicle.

When only a single radio paging transmission is sent by temperature alarm device, the caregiver may be temporarily obscured from radio reception, may be distracted and not acknowledge the alarm, or may be unable to hear the alarm. Thus, the caregiver is unaware that the temperature is above the predetermined level within the vehicle. Criminalistics, Inc. of Miami, Fla. offers a temperature alarm device under the model designation Hot Dog that includes a housing, and a remote temperature sensor that may be mounted near the canine compartment of the vehicle. More particularly, the control electronics mounted within the housing cause repeated sending of an alarm paging signal.

Various temperature monitoring and alarm devices have been used for vehicle related applications other than for animal protection. For example, U.S. Pat. No. 4,970,496 to Kirkpatrick patent discloses a data acquisition module for recording temperature readings from within the refrigerated compartment of a truck. The data acquisition module may be provided with a radio pager alarm to send alarms to the driver in the event that temperature of the trailer approaches unacceptable limits or the doors of the trailer are opened without authority. The data acquisition module may be connected to refrigeration compressor sensors to determine an impending compressor failure before temperatures start to rise. U.S. Pat. No. 4,851,822 to Barnett discloses a temperature monitoring apparatus for a compartment of a vehicle.

Returning again to the area of animal protection, a particular area of concern is for show animals, such as show dogs. These animals may be left unattended for considerable periods of time in a vehicle trailer, mobile home, or van which is connected to an alternating current (AC) power supply or "shore power" distributed to the vehicle at the parking facility. The ventilation fan and air conditioner for the vehicle may be powered from the AC power supply. The vehicle may also be of the type including an electrical generator, separate from the vehicle engine, which powers the air conditioner and ventilation fan when the vehicle engine is not running.

Unfortunately, a conventional vehicle temperature alarm device operates from the vehicle electrical system. Accordingly, should the vehicle electrical power fail, the radio paging is not possible. Thus, the health and safety of an animal may be insufficiently protected, particularly where the vehicle is of the type including a separate electrical generator, or is operated from shore power.

Another disadvantage of many conventional vehicle temperature alarm devices for protecting an animal is that the devices may be difficult to install and require permanent connections to the vehicle electrical system and other components. Accordingly, such an alarm device is not readily installed or removed from the vehicle, such as for safekeeping or to transfer to another vehicle.

SUMMARY OF THE INVENTION

In view of the foregoing background, it is therefore an object of the present invention to provide a reliable alarm apparatus and associated method for alerting an animal caregiver of unsafe or undesirable conditions within the vehicle containing the animal.

It is another object of the present invention to provide a portable alarm apparatus and associated method for alerting an animal caregiver even when vehicle electrical power has failed.

These and other objects, advantages, and features of the present invention are provided by an alarm apparatus including vehicle temperature sensing means, vehicle power failure sensing means, and radio paging alarm means for generating a radio paging output signal to a remote paging receiver carried by the animal caregiver responsive to at least one of vehicle temperature being outside a predetermined temperature range, and failure of vehicle electrical power. Accordingly, the animal caregiver is alerted by the radio paging alarm signal when the temperature within the vehicle is outside the predetermined range, or when the temperature within the vehicle is likely to move outside the predetermined range as indicated by a failure of AC or DC vehicle electrical power.

The alarm apparatus is preferably portable and includes a relatively compact housing for installation within the vehicle. The apparatus also preferably includes internal power supply means positioned within the housing and comprises a battery and charging means for charging the battery from vehicle electrical power. The vehicle power failure sensing means is preferably operatively connected to the vehicle electrical power that supplies power to the charger for sensing failure of the vehicle electrical power. The battery provides back-up power for the apparatus should the electrical power of the vehicle fail.

The radio paging alarm means also preferably includes repeating means for repeatedly generating the radio paging signal. Thus, even if the remote paging receiver carried by the caregiver is temporarily obscured from receiving a given alarm signal, the caregiver is likely to receive a subsequent signal and be able to respond to the alarm. A reset switch is carried by the housing and is depressed to stop the repeating radio paging alarm signals.

The power supply means preferably includes a first connector carried by the housing for connection to an alternating current (AC) electrical power source of the vehicle. The power supply means also preferably comprises a second connector carried by the housing for connection to a direct current (DC) electrical power source of the vehicle. The apparatus may preferably operate from the DC vehicle electrical power; however, the vehicle power failure sensing means may also selectively interface with the AC connector so that an alarm is generated if AC vehicle electrical power fails.

The temperature sensing means is preferably a high quality device including a temperature sensing probe carried by the housing. In addition, the temperature sensing means preferably comprises range setting means for permitting setting of the predetermined temperature range for triggering the radio paging alarm signal.

The radio paging alarm means also preferably comprises an antenna connector carried by the housing to facilitate connection to an antenna mounted on the vehicle. One or more relay contacts for providing an auxiliary alarm output signals may be provided, and, similarly, one or more auxiliary alarm triggering inputs may be provided.

A method aspect of the present invention is for alerting an animal caregiver away from the vehicle when an undesirable condition occurs within the vehicle, such as the temperature within the vehicle being outside a predetermined range, or when the temperature within the vehicle is likely to move outside the predetermined range as indicated by a failure of vehicle electrical power. The method preferably comprises the steps of: sensing vehicle temperature; sensing failure of vehicle electrical power; and generating a radio paging output signal to a remote paging receiver carried by the animal caregiver responsive to one of vehicle temperature being outside a predetermined temperature range and/or failure of vehicle electrical power. The method also preferably further comprises the step of repeatedly sending the radio paging alarm signal until reset.

The method may additionally include the steps of: sensing an auxiliary alarm input, and generating a radio paging output signal to the remote paging receiver carried by the animal caregiver responsive to receipt of an auxiliary alarm input signal. Accordingly, a smoke detector may, for example, provide an input to the alarm apparatus for triggering a radio paging alarm signal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
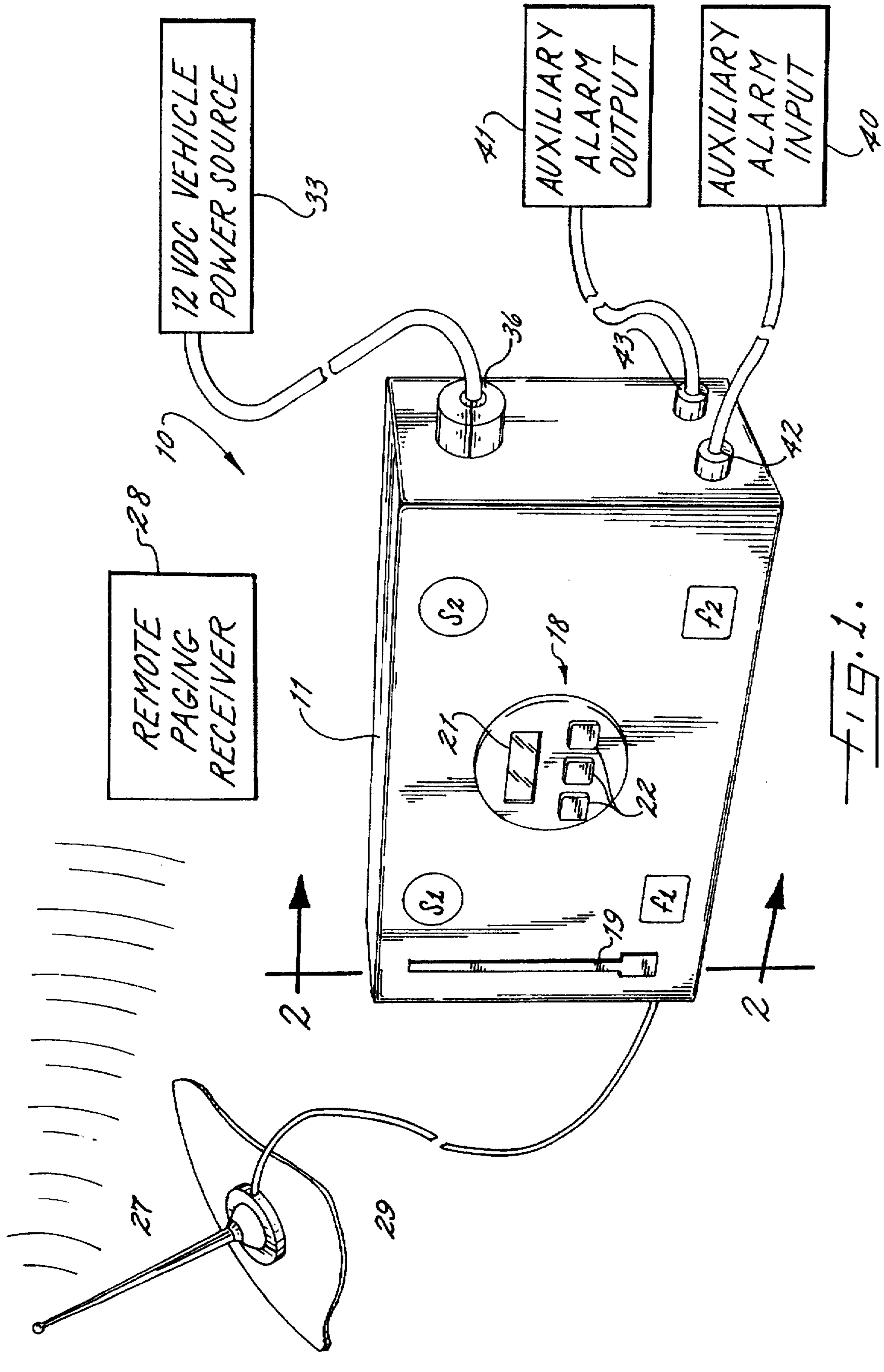
FIG. 1 is a schematic diagram illustrating a portable alarm apparatus embodiment according to the invention.
Figure 3:
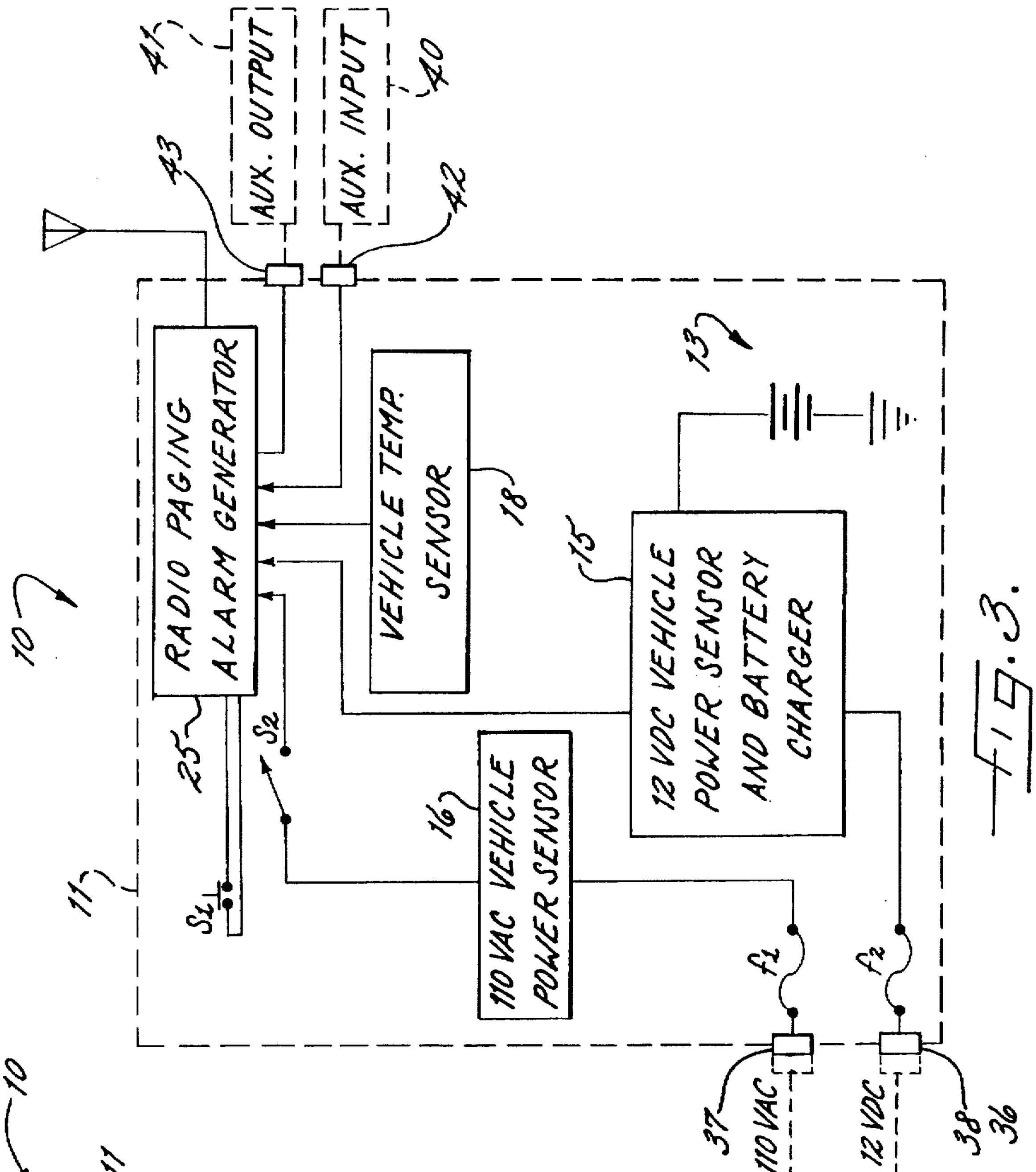
FIG. 3 is a schematic block diagram of the alarm apparatus illustrating the functional components of the apparatus in further detail.
Figure 2:
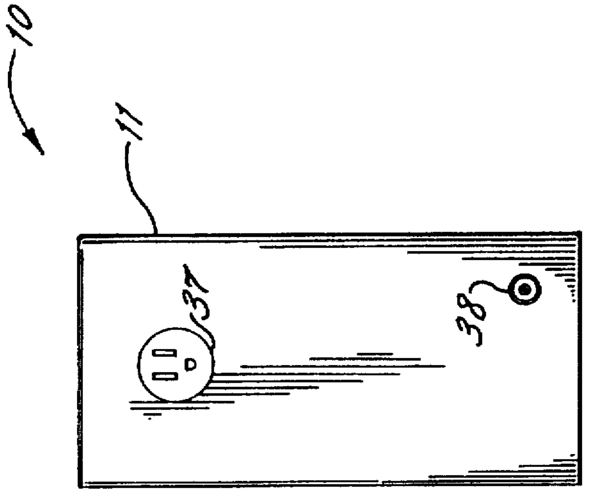
FIG. 2 is a side view of the apparatus taken along lines 2—2 of FIG. 1.

Referring initially to FIGS. 1–3 a portable embodiment of the alarm apparatus 10 according to the invention is first described. The alarm apparatus 10 is preferably compact and portable as illustrated to facilitate installation in a vehicle containing an animal for alerting an animal caregiver who is away from the vehicle responsive to conditions within the vehicle which may be detrimental to the animal.

In particular, the alarm apparatus 10 is directed to avoiding situations wherein a temperature within the vehicle is outside a predetermined range or is likely to move outside the predetermined range. As would be readily understood by those skilled in the art, the temperature within a closed vehicle in a warm climate may quickly rise to a detrimental level if ventilation and/or air conditioning of the vehicle were to fail.

The portable alarm apparatus 10 includes a housing 11 for positioning within the vehicle. The apparatus also includes power supply means positioned within the housing and comprising a battery 13 and charging means for charging the battery from vehicle electrical power. As would be readily understood by those skilled in the art, the vehicle electrical power normally powers the electronic components of the alarm apparatus 10. In the event of a failure of the vehicle electrical power, the apparatus 10 is still operative as it is then powered from the back-up battery 13.

The alarm apparatus 10 also includes vehicle power failure sensing means which may include a relay or other similar circuit within the schematically illustrated 12 VDC vehicle power sensor and battery charger 15. For example, the 12 VDC vehicle power failure sensor may be a relay so that a relay contact closure is provided to the radio paging alarm generator 25 upon loss of vehicle electrical power. Thus, a reliable and uncomplicated circuit is provided for sensing a failure of 12 VDC vehicle electrical power. In particular, a failure of the 12 VDC vehicle electrical power may likely result in a failure of the ventilation fan and/or the air conditioner of certain type vehicles thereby potentially causing the temperature within the vehicle to quickly rise to a detrimental level. The vehicle power failure sensing means according to the invention alerts the animal caregiver in the event of a failure of the vehicle electrical power.

The alarm apparatus 10 also includes vehicle temperature sensing means 18 carried by the housing for sensing a temperature within the vehicle. In particular, the vehicle temperature sensing means 18 may include a temperature sensing probe 19 mounted on an exterior of the housing 11. The vehicle temperature sensing means 18 may also include a display 21 for displaying the sensed vehicle temperature and various switches 22 for setting high and low temperature limits as would be readily understood by those skilled in the art. The temperature sensing means may preferably be provided by Cooper Instruments of Middlefield, Conn. having a model designation PM 200A16 and with a probe model designation 2020. The temperature sensing means 18 provides a relay contact closure, for example, if the sensed temperature is outside the predetermined temperature range.

The alarm apparatus 10 also preferably includes radio paging alarm means 25 operatively connected to the vehicle power failure sensing means and the vehicle temperature sensing means 18 for generating a radio paging output signal to be received by the remote paging receiver 28 carried by the animal caregiver responsive to one of a failure of the vehicle electrical power and vehicle temperature being outside a predetermined temperature range. The radio paging alarm means may preferably be provided by a model 8200 2-channel radio paging unit available from Alpine Electronics of America, Inc. of Torrance, Calif. which accepts a relay contact closure to trigger the radio paging alarm signal. Accordingly, the animal caregiver is alerted by the radio paging alarm signal when the temperature within the vehicle is outside the predetermined range, and also prior to the temperature exceeding the predetermined temperature range when the vehicle is likely to move outside the predetermined range as indicated by a failure of the vehicle electrical power.

In other words, two levels of protection are provided in the event that a rise in temperature, for example, is caused by a loss or failure of electrical power within the vehicle. The failure of electrical power may unfortunately be a common occurrence for a vehicle of a type such as a trailer or motor home which may include a self-contained electrical generator 30 or which may be connected to shore power 31 as is commonly available at many parking facilities.

The alarm apparatus 10 preferably includes a 12 VDC connector 36 carried by the housing 11 for connection to a 12 VDC vehicle power source 33 via fuse f2. In addition, as shown in FIG. 2, the alarm apparatus 10 may also preferably include a conventional male three prong plug 37 and associated fuse f1 for connection to a 110 VAC outlet within the vehicle which is typically available if the vehicle is capable of operation from shore power 31 or has its own generator 30. As also shown in FIG. 2, the housing 11 may preferably carry a conventional coaxial type connector 38 to permit the output of the radio paging alarm generator means 25 to be delivered to a conventional citizens band radio antenna 27 positioned on the vehicle's exterior 29 as shown in the illustrated embodiment.

A selector switch S2 may be provided to permit sensing or monitoring of the 110 VAC vehicle electrical power. Thus, the vehicle power failure sensing means may preferably comprise a 110 VAC vehicle electrical power sensor 16 for sensing a failure of the 110 VAC vehicle electrical power and providing a radio paging alert responsive thereto. The 110 VAC vehicle electrical power sensor 16 may be provided by a simple relay or an equivalent electronic circuit as would be readily understood by those skilled in the art.

The radio paging alarm means 25 of the alarm apparatus preferably further comprises repeating means for repeatedly sending the radio paging alarm signal. Thus, even if the animal caregiver fails to receive or notice the initial page from his remote paging receiver 28, subsequent alarm signals will be repeatedly sent until the caregiver returns to the vehicle and manually resets a switch Si mounted on the housing 11.

One or more auxiliary inputs 40 and auxiliary outputs 41 may be optionally connected to the alarm apparatus 10 via respective input and output connectors 42, 43, as would be readily understood by those skilled in the art. Accordingly, the apparatus 10 preferably includes means to accept another alarm input signal, or to trigger operation of a local alarm device. For example, the auxiliary input may be connected to a smoke detector, and the auxiliary output may be connected to the power windows, or to a local alarm indicator, such as vehicle lights or a siren carried by the vehicle.

Figure 4:
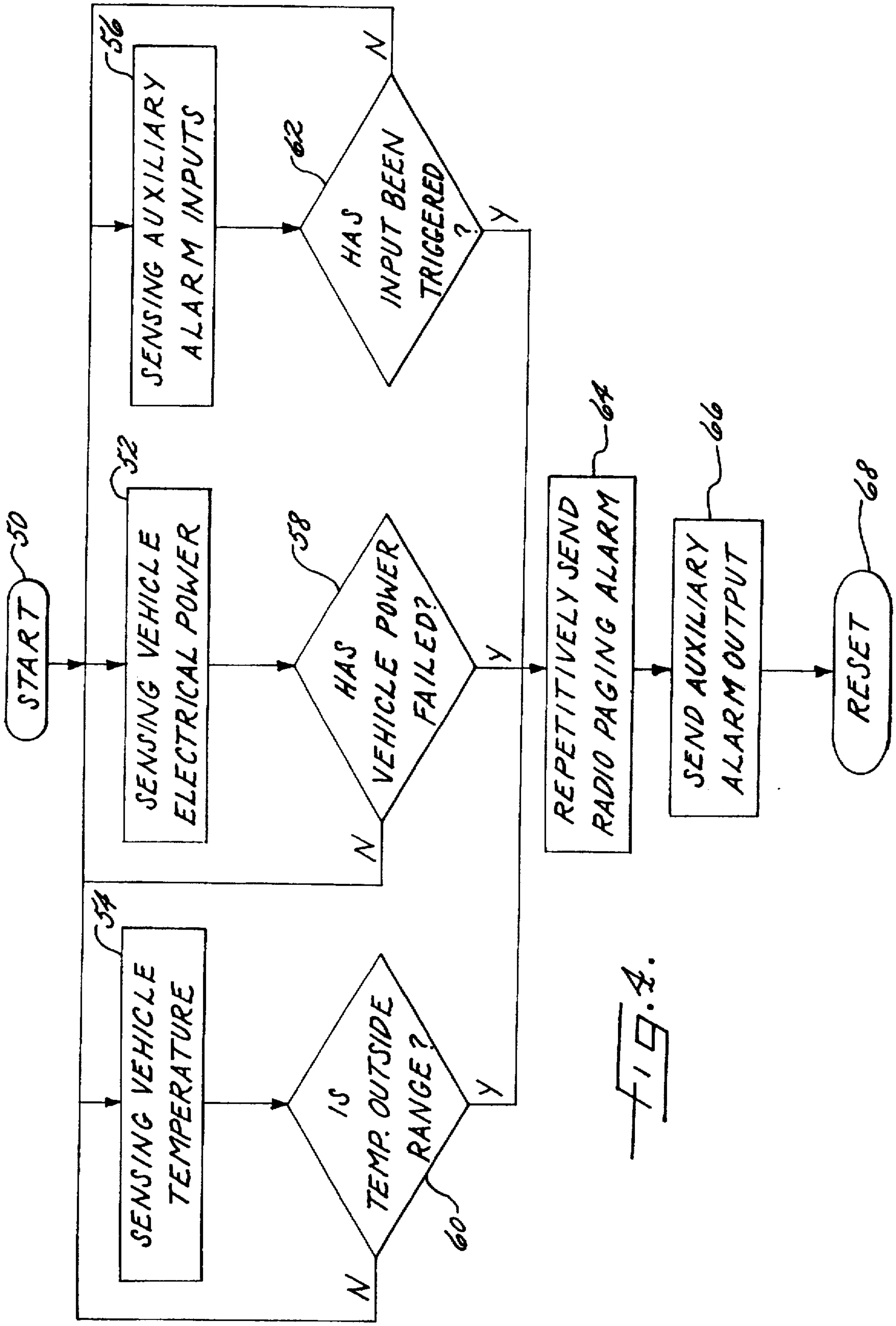
FIG. 4 is a flowchart illustrating operation of the apparatus and related method according to the invention.

Further operation of the apparatus 10 according to the invention and the method aspects of the invention are described with reference additionally to the flowchart of FIG. 4. The method is for alerting an animal caregiver away from the vehicle when an undesirable condition occurs within the vehicle. In particular, an alarm is preferably given to the caregiver if the temperature within the vehicle is outside a predetermined range and when the temperature within the vehicle is likely to move outside the predetermined range. The animal caregiver may also be alerted responsive to an auxiliary alarm input, such as a smoke detector, for example.

Upon turning on the alarm apparatus 10 (Block 50), the apparatus senses a failure of the vehicle electrical power source at Block 52, senses a temperature within the vehicle at Block 54; and may optionally sense any connected auxiliary alarm inputs at Block 56. If the vehicle electrical power has failed (Block 58), or the vehicle is outside the desired temperature range (Block 60), or an auxiliary alarm input is sensed (Block 62), a repeating radio paging output signal is generated at Block 64 to be received by the animal caregiver.

In addition, an auxiliary alarm output may also be sent at Block 66, such as for generating a local siren or flashing of the vehicle lights. The alarm apparatus 10 will continue to send the repeating radio paging alarm signal and produce the auxiliary alarm output until reset (Block 68) by depressing the reset switch S1.

The step of sensing a failure of the vehicle electrical power preferably comprises connecting the alarm apparatus 10 described above to one of an AC electrical power source and/or a DC electrical power source of the vehicle. The method also preferably includes the step of setting the predetermined temperature range.

As would be readily understood by those skilled in the art, the functions of the alarm apparatus 10 may be provided by discrete electronic logic components and/or may be implemented using a microprocessor operating under stored program control. Also, the alarm apparatus 10 itself may selectively operate from 12 VDC or 110 VAC vehicle electrical power or both. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A portable alarm apparatus for installation in a vehicle containing an animal for alerting an animal caregiver away from the vehicle when an undesired condition occurs within the vehicle, said portable alarm apparatus comprising:

- a relatively compact portable housing for positioning within the vehicle;
- power supply means in said housing and comprising a battery and charging means for charging said battery from vehicle electrical power;
- vehicle temperature sensing means positioned at said housing for sensing vehicle temperature;
- vehicle power failure sensing means in said housing for being operatively connected to vehicle electrical power for sensing failure of vehicle electrical power including a complete loss thereof; and
- radio paging alarm means in said housing and operatively connected to said vehicle temperature sensing means and said vehicle power failure sensing means and being powered by said battery of said power supply means during a complete loss of vehicle electrical power for generating a radio paging output signal to be received by a remote paging receiver carried by the animal caregiver responsive to at least one of vehicle temperature being outside a predetermined temperature range and failure of vehicle electrical power including a complete loss of vehicle electrical power or both vehicle temperature being outside a predetermined temperature range and failure of vehicle electrical power including a complete loss of vehicle electrical power.

2. A portable alarm apparatus according to claim 1 wherein said radio paging alarm means further comprises repeating means for repeatedly sending the radio paging alarm signal.

3. A portable alarm apparatus according to claim 2 wherein said radio paging alarm means further comprises reset switch means carried by said housing for permitting resetting of the radio paging alarm generating means.

4. A portable alarm apparatus according to claim 1 further comprising auxiliary input means for accepting an auxiliary alarm input signal for causing said radio paging alarm means to generate a radio paging alarm signal responsive to an auxiliary alarm input signal.

5. A portable alarm apparatus according to claim 1 further comprising a first connector carried by said housing for connection to alternating current (AC) vehicle electrical power, and a second connector carried by said housing for connection to direct current (DC) vehicle electrical power.

6. A portable alarm apparatus according to claim 5 wherein said vehicle power failure sensing means is operatively connected to both said first and second connectors for sensing a failure of either AC or DC vehicle electrical power.

7. A portable alarm apparatus according to claim 1 wherein said charging means includes means for operating from direct current (DC) vehicle power, and wherein said vehicle power failure sensing means includes means for sensing a failure of DC vehicle electrical power.

8. A portable alarm apparatus according to claim 1 wherein said temperature sensing means further comprises a temperature sensing probe carried by said housing.

9. A portable alarm apparatus according to claim 1 wherein said radio paging alarm means further comprises an antenna connector carried by said housing to facilitate connection to an antenna mounted on the vehicle.

10. A portable alarm apparatus according to claim 1 wherein said vehicle temperature sensing means further comprises range setting means for permitting setting of the predetermined temperature range.

11. A portable alarm apparatus according to claim 1 further comprising auxiliary output means for providing an auxiliary alarm output signal.

12. A portable alarm apparatus according to claim 1 further comprising a remote paging receiver for carrying by the animal caregiver.

13. A portable alarm apparatus for installation in a vehicle containing an animal for alerting an animal caregiver away from the vehicle when an undesired condition occurs within the vehicle, said portable alarm apparatus comprising:

- a relatively compact portable housing for positioning within the vehicle;
- a power supply in said housing and comprising a battery and associated charger for charging the battery from vehicle electrical power;
- a vehicle temperature sensor positioned at said housing for sensing vehicle temperature;
- a vehicle power failure sensor in said housing for sensing failure of vehicle electrical power including a complete loss thereof; and
- radio paging alarm means in said housing and operatively connected to said vehicle temperature sensor and said vehicle power failure sensor and being powered by said battery of said power supply during a complete loss of vehicle electrical power for generating a radio paging output signal to be received by a remote paging receiver carried by the animal caregiver responsive to at least one of vehicle temperature being outside a predetermined temperature range and failure of vehicle electrical power including a complete loss of vehicle electrical power, said radio paging alarm means further comprising repeating means for repeatedly sending the radio paging alarm signal or both vehicle temperature being outside a predetermined temperature range and failure of vehicle electrical power including a complete loss of vehicle electrical power.

14. An alarm apparatus according to claim 13 further comprising a housing, and wherein said radio paging alarm means further comprises reset switch means carried by said housing for permitting resetting of the radio paging alarm means.

15. An alarm apparatus according to claim 13 further comprising auxiliary input means for accepting an auxiliary alarm input signal for causing said radio paging alarm means to generate a radio paging alarm signal responsive to an auxiliary alarm input signal.

16. A portable alarm apparatus according to claim 13 further comprising a first connector for connection to alternating current (AC) vehicle electrical power, and a second connector for connection to direct current (DC) vehicle electrical power; and wherein said vehicle power failure sensing means is operatively connected to both said first and second connectors for sensing a failure of either AC or DC vehicle electrical power.

17. An alarm apparatus according to claim 13 further comprising auxiliary output means for providing an auxiliary alarm output signal.

18. An alarm apparatus according to claim 13 further comprising a remote paging system for carrying by the animal caregiver.

19. A method for alerting an animal caregiver away from a vehicle containing an animal when an undesired condition occurs within the vehicle, said method comprising the steps of:

- sensing vehicle temperature;
- sensing failure of vehicle electrical power; and
- generating a radio paging output signal to a remote paging receiver carried by the animal caregiver responsive to at least one of vehicle temperature being outside a predetermined temperature range and failure of vehicle electrical power or both vehicle temperature being outside a predetermined temperature range and failure of vehicle electrical power.

20. A method according to claim 19 further comprising the step of repeatedly sending the radio paging alarm signal until reset.

21. A method according to claim 19 further comprising the steps of:

- sensing an auxiliary alarm input; and
- generating a radio paging output signal to the remote paging receiver carried by the animal caregiver responsive to receipt of an auxiliary alarm input signal.

22. A method according to claim 19 further comprising the step of setting the predetermined temperature range.

23. A method according to claim 19 further comprising the step of providing an auxiliary alarm output signal responsive to one of vehicle temperature being outside a predetermined temperature range and failure of vehicle electrical power.

* * * * *